US 012276185B2

(12) United States Patent
Hull et al.

(10) Patent No.: US 12,276,185 B2
(45) Date of Patent: Apr. 15, 2025

(54) STIMULATING HYDROCARBON RESERVOIRS (71) Applicant: Saudi Arabian Oil Company, Dhahran (SA)

(72) Inventors: Katherine Leigh Hull, Houston, TX (US); Amy J. Cairns, Houston, TX (US); Rajesh Kumar Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/416,517

(22) Filed: Jan. 18, 2024

(65) Prior Publication Data
US 2024/0200430 A1 Jun. 20, 2024

Related U.S. Application Data (62) Division of application No. 17/829,972, filed on Jun. 1, 2022, now Pat. No. 11,905,804.

(51) Int. Cl.
*E21B 43/16* (2006.01)
*E21B 43/25* (2006.01)
(52) U.S. Cl.
CPC ............ *E21B 43/164* (2013.01); *E21B 43/25* (2013.01)
(58) Field of Classification Search
None
See application file for complete search history.

(56) References Cited

U.S. PATENT DOCUMENTS

| | | |
|---|---|---|
| 3,456,183 A | 7/1969 | Codrington et al. |
| 3,616,855 A | 11/1971 | Colgate |
| 3,912,330 A | 10/1975 | Carnahan et al. |
| 4,043,599 A | 8/1977 | Lingane |
| 4,108,965 A | 8/1978 | Christe |
| 5,031,700 A | 7/1991 | McDougall et al. |
| 5,199,490 A | 4/1993 | Surles et al. |
| 5,944,104 A | 8/1999 | Riese et al. |
| 5,967,233 A | 10/1999 | Riese et al. |
| 6,076,046 A | 6/2000 | Vassudevan |

(Continued)

FOREIGN PATENT DOCUMENTS

| | | |
|---|---|---|
| CA | 2635868 | 12/2008 |
| CN | 101819111 | 12/2011 |

(Continued)

OTHER PUBLICATIONS

Dhanuka; "High internal phase CO2-in-water emulsions stabilized with a branched nonionic hydrocarbon surfactant"; Journal of Colloid and Interface Science; vol. 298, 2006, p. 406-418. (Year: 2006).*

(Continued)

*Primary Examiner* — Andrew Sue-Ako
(74) *Attorney, Agent, or Firm* — Fish & Richardson P.C.

(57) ABSTRACT

Techniques for treating a hydrocarbon reservoir include delivering a composition to the hydrocarbon reservoir. The composition includes at least one acid, and liquid or supercritical carbon dioxide ($CO_2$). The method further includes exposing the delivered composition to water to activate the composition; and treating a rock formation of the hydrocarbon reservoir with the activated composition.

22 Claims, 5 Drawing Sheets

(56) References Cited

U.S. PATENT DOCUMENTS

| | | | |
|---|---|---|---|
| 6,131,661 A | 10/2000 | Conner et al. | |
| 6,143,698 A | 11/2000 | Murphey et al. | |
| 6,705,398 B2 | 3/2004 | Weng | |
| 6,715,553 B2 | 4/2004 | Reddy et al. | |
| 7,007,752 B2 | 3/2006 | Reddy et al. | |
| 7,011,154 B2 | 3/2006 | Maher et al. | |
| 7,077,199 B2 | 7/2006 | Vinegar et al. | |
| 7,148,184 B2 | 12/2006 | Francini et al. | |
| 7,291,651 B2 | 11/2007 | Chen et al. | |
| 7,513,306 B2 | 4/2009 | Pfefferle et al. | |
| 7,642,223 B2 | 1/2010 | Santra et al. | |
| 7,878,248 B2 | 2/2011 | Abad et al. | |
| 8,146,416 B2 | 4/2012 | Pisio et al. | |
| 8,616,294 B2 | 12/2013 | Zubrin et al. | |
| 8,899,331 B2 | 12/2014 | Burnham et al. | |
| 9,033,033 B2 | 5/2015 | Thomas et al. | |
| 9,644,137 B2 | 5/2017 | Dean et al. | |
| 10,472,555 B2 | 11/2019 | Hutchins et al. | |
| 10,479,927 B2 | 11/2019 | Hull et al. | |
| 11,131,177 B2 | 9/2021 | Lo Cascio et al. | |
| 11,319,478 B2 | 5/2022 | Schipper et al. | |
| 11,905,804 B2 * | 2/2024 | Hull | C09K 8/74 |
| 2002/0003115 A1 | 1/2002 | Conaway et al. | |
| 2004/0101457 A1 | 5/2004 | Pahlman et al. | |
| 2005/0039919 A1 | 2/2005 | Harris et al. | |
| 2005/0059558 A1 | 3/2005 | Blauch | |
| 2007/0137858 A1 | 6/2007 | Considine et al. | |
| 2007/0235181 A1 | 10/2007 | Lecampion et al. | |
| 2008/0006410 A1 | 1/2008 | Looney et al. | |
| 2008/0217012 A1 | 9/2008 | Delorey et al. | |
| 2009/0032252 A1 | 2/2009 | Boney et al. | |
| 2009/0044945 A1 | 2/2009 | Wilberg et al. | |
| 2009/0145607 A1 | 6/2009 | Li et al. | |
| 2009/0203557 A1 | 8/2009 | Barnes et al. | |
| 2010/0044049 A1 | 2/2010 | Leshchyshyn et al. | |
| 2010/0126936 A1 | 5/2010 | Jones et al. | |
| 2010/0243248 A1 | 9/2010 | Golomb et al. | |
| 2010/0323933 A1 | 12/2010 | Fuller et al. | |
| 2011/0005969 A1 | 1/2011 | Giffin | |
| 2011/0198101 A1 * | 8/2011 | Sanders | C09K 8/584 |
| | | | 166/402 |
| 2012/0160486 A1 | 6/2012 | Wigand | |
| 2013/0161008 A1 | 6/2013 | Klingler et al. | |
| 2013/0306321 A1 | 11/2013 | Lanctot-Downs et al. | |
| 2013/0341028 A1 | 12/2013 | Christian et al. | |
| 2015/0041136 A1 | 2/2015 | Martin | |
| 2015/0068749 A1 | 3/2015 | Wernimont | |
| 2015/0083405 A1 | 3/2015 | Dobroskok | |
| 2015/0083420 A1 | 3/2015 | Gupta et al. | |
| 2015/0300140 A1 | 10/2015 | Eoff et al. | |
| 2016/0017202 A1 | 1/2016 | Yang et al. | |
| 2016/0024370 A1 | 1/2016 | Ba geri et al. | |
| 2016/0061017 A1 | 3/2016 | Nguyen et al. | |
| 2016/0177674 A1 | 6/2016 | Shetty et al. | |
| 2017/0051598 A1 | 2/2017 | Ouenes | |
| 2017/0051599 A1 | 2/2017 | Bestaoui-Spurr et al. | |
| 2017/0066959 A1 | 3/2017 | Hull et al. | |
| 2017/0145793 A1 | 5/2017 | Ouenes | |
| 2017/0247997 A1 | 8/2017 | Kovalevsky | |
| 2017/0328179 A1 | 11/2017 | Dykatra et al. | |
| 2018/0305208 A1 | 10/2018 | Mason | |
| 2018/0327658 A1 | 11/2018 | Al-Harbi et al. | |
| 2018/0355707 A1 | 12/2018 | Herrera et al. | |
| 2019/0010795 A1 | 1/2019 | Cascio et al. | |
| 2019/0078424 A1 | 3/2019 | Copeland et al. | |
| 2019/0292436 A1 | 9/2019 | Mason et al. | |
| 2020/0048531 A1 | 2/2020 | Hull et al. | |
| 2021/0024808 A1 | 1/2021 | Schipper et al. | |
| 2021/0024814 A1 * | 1/2021 | Schipper | C09K 8/035 |
| 2021/0198558 A1 | 7/2021 | Hull et al. | |
| 2021/0198559 A1 | 7/2021 | Hull et al. | |
| 2021/0246363 A1 | 8/2021 | Al-Jawad et al. | |
| 2022/0213376 A1 | 7/2022 | Schipper | |
| 2023/0392484 A1 | 12/2023 | Hull et al. | |

FOREIGN PATENT DOCUMENTS

| | | |
|---|---|---|
| CN | 1621803 | 5/2012 |
| CN | 103387827 | 11/2013 |
| CN | 102183410 | 5/2014 |
| CN | 105445440 | 3/2016 |
| CN | 105567213 | 5/2016 |
| EP | 0247669 | 12/1987 |
| EP | 2480625 | 4/2013 |
| EP | 2480626 | 4/2013 |
| WO | WO 1997028098 | 8/1997 |
| WO | WO 2000060379 | 10/2000 |
| WO | WO 2001094749 | 12/2001 |
| WO | WO 2002064702 | 8/2002 |
| WO | WO 2004005435 | 1/2004 |
| WO | WO 2008001218 | 1/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012057910 | 5/2012 |
| WO | WO 2012087887 | 6/2012 |
| WO | WO 2012087898 | 6/2012 |
| WO | WO 2012088476 | 6/2012 |
| WO | WO 2012104582 | 8/2012 |
| WO | WO 2012122505 | 9/2012 |
| WO | WO 2012171857 | 12/2012 |
| WO | WO 2013052359 | 4/2013 |
| WO | WO 2013112114 | 8/2013 |
| WO | WO 2013149122 | 10/2013 |
| WO | WO 2013155061 | 10/2013 |
| WO | WO 2014008598 | 1/2014 |
| WO | WO 2014123672 | 8/2014 |
| WO | WO 2015041664 | 3/2015 |
| WO | WO 2015097116 | 7/2015 |
| WO | WO 2015126082 | 8/2015 |
| WO | WO 2015163858 | 10/2015 |
| WO | WO 2015181028 | 12/2015 |
| WO | WO 2015200060 | 12/2015 |
| WO | WO 2016094153 | 6/2016 |
| WO | WO 2017035371 | 3/2017 |
| WO | WO 2017040824 | 3/2017 |
| WO | WO 2017040834 | 3/2017 |
| WO | WO 2017086975 | 5/2017 |
| WO | WO 2017136641 | 8/2017 |
| WO | WO 2018025010 | 2/2018 |
| WO | WO 2018045290 | 3/2018 |
| WO | WO 2019140058 | 7/2019 |

OTHER PUBLICATIONS

Abousleiman and Nguyen, "Poromechanics Response of Inclined Wellbore Geometry in Fractured Porous Media," Journal of Engineering Mechanics, ASCE, Nov. 2005, 131:11, 14 pages.

Abousleiman et al., "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.

Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.

Alduailej et al., "CO 2 Emulsified Fracturing Fluid for Unconventional Applications," SPE-177405, Society of Petroleum Engineers, Abu Dhabi International Petroleum Exhibition and Conference held in Abu Dhabi, UAE, Nov. 9-12, 2015, 12 pages.

Bazant et al., "Strain-Softening Bar and Beam: Exact Non-Local Solution," Int. J. Solids Structures, 1988, 24:7 (659-673), 15 pages.

Bell et al., "Strong Lewis Acid-Lewis Base Interactions between Supercritical Carbon Dioxide and Carboxylic Acids: Effects on Self-Association," Industrial & Engineering Chemistry Research, Sep. 2003, 42(25):6280-6289, 10 pages.

Bristow et al., "Solubility Analysis of Drug Compounds in Supercritical Carbon Dioxide Using Static and Dynamic Extraction Systems," Industrial & Engineering Chemistry Research, Mar. 2001, 40(7):1732-1739, 8 pages.

(56) References Cited

OTHER PUBLICATIONS

Bunzil et al., "Taking Advantage of Luminescent Lanthanide Ions," Chemical Society Reviews (CSR), Critical Review, 34: 1048-1077, Dec. 2005, 30 pages.

Custelcean et al., "Aqueous Sulfate Separation by Crystallization of Sulfate-Water Clusters," Angewandte Chemie, International Edition, 2015, 54: 10525-10529, 5 pages.

Da Rocha et al., "Concentrated CO2-in-Water Emulsions with Nonionic Polymeric Surfactants," Journal of Colloid and Interface Science, Jul. 2001, 239(1):241-253, 13 pages.

Eastoe et al., "Water-in-CO2 Microemulsions Studied by Small-Angle Neutron Scattering," Langmuir, Dec. 1997, 13(26):6980-6984, 5 pages.

Fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.

Fjaer et al., "Stresses around Boreholes. Borehole Failure Criteria," in Petroleum Related Rock Mechanics, 2nd Edition, 2008, 156, 1 page.

Ganjdanesh et al. "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.

Gregorowicz et al., "Solubilities of Lactic Acid and 2-Hydroxyhexanoic Acid in Supercritical CO2," Fluid Phase Equilibria, Dec. 1999, 166(1):39-46, 8 pages.

Guan et al., "Effect of Acetic Acid+acetonitrile and Ethanol+acetonitrile Mixed Cosolvents on the Solubility of Stearic Acid in Supercritical CO2," Fluid Phase Equilibria, Aug. 1998, 149(1-2):277-286, 10 pages.

Harrison et al., "Water-in-Carbon Dioxide Microemulsions with a Fluorocarbon-Hyderocarbon Hybrid Surfactant," Langmuir, Oct. 1994, 10(10):3536-3541, 6 pages.

Jia et al., "Highly Efficient Extraction of Sulfate Ions with a Tripodal Hexaurea Receptor," Angew. Chem. Int. Ed., 2011, 50: 486-490, 5 pages.

Jin et al., "Solubilities of Benzoic Acid in Supercritical CO2 with Mixed Cosolvent," Fluid Phase Equilibria, Dec. 2004, 226:9-13, 5 pages.

Johnston et al., "Water-in-Carbon Dioxide Microemulsions: An Environment for Hydrophiles Including Proteins," Science, Feb. 1996, 271(5249):624-626, 3 pages.

Jones et al., "HF Etchant Solutions in Supercritical Carbon Dioxide for "Dry" Etch Processing of Microelectronic Devices," Chemistry of Materials, Jun. 2003, 15(15):2867-2869, 3 pages.

Kang et al., "An experimental study on oxidizer treatment used to improve the seepage capacity of coal reservoirs," Natural Gas Industry B, 6: 129-137, Sep. 25, 2018, 9 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Middleton et al, "Shale gas and non-aqueous fracturing fluids: Opportunities and challenges for supercritical CO 2," Applied Energy, 147: 500-509, 2015, 10 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.

Rajbanshi et al., "Sulfate Separation from Aqueous Alkaline Solutions by Selective Crystallization of Alkali Metal Coordination Capsules," American Chemical Society Publications (ACS), Crystal Growth and Design, 2011, 11: 2702-2706, 5 pages.

Ryoo et al., "Water-in-Carbon Dioxide Microemulsions with Methylated Branched Hydrocarbon Surfactants," Industrial & Engineering Chemistry Research, Jul. 2003, 42(25):6348-6358, 11 pages.

Sagisaka et al., "Effect of Fluorocarbon and Hydrocarbon Chain Lengths in Hybrid Surfactants for Supercritical CO2," Langmuir, Jun. 2015, 31(27):7479-7487, 36 pages.

Sagisaka et al., "Nanostructures in Water-in-CO2 Microemulsions Stabilized by Double-Chain Fluorocarbon Solubilizers," Langmuir, May 2013, 29(25):7618-7628, 11 pages.

Sagisaka et al., "New Class of Amphiphiles Designed for Use in Water-in-Supercritical CO2 Microemulsions," Langmuir, Jul. 2016, 32(47):12413-12422, 44 pages.

Sagisaka et al., "Water-in-CO2 Microemulsions Stabilized by Fluorinated Cation-Anion Surfactant Pairs." Langmuir, Feb. 2019, 35(9):3445-3454, 10 pages.

Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.

Serra, "No Pressure Transient Analysis Methods for Naturally Fractured Reservoirs," (includes associated papers 12940 and 13014), Journal of Petroleum Technology, Dec. 1983, 35:12, Society of Petroleum Engineers, 18 pages.

Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.

Ulm et al., "The Nanogranular Nature of Shale," Acta Geotechnica, Springer, Jun. 15, 2006, 1:2, 12 pages.

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.

Wu et al., "Extraction of kerogen from oil shale with supercritical carbon dioxide: Molecular dynamics simulations," the Journal of Supercritical Fluids, 107: 499-506, Jan. 2016, 8 pages.

Zhang et al., "Solubility of P-Methylbenzene Sulfonic Acid in Pure and Modified Supercritical Carbon Dioxide," Journal of Chemical & Engineering Data, Jan. 2008, 53(2):600-602, 3 pages.

Zhong et al., "Solubility of Stearic Acid in Supercritical CO2 with Cosolvents," The Journal of Supercritical Fluids, Jun. 1997, 10(2):113-118, 6 pages.

Zielinski et al., "A Small-Angle Neutron Scattering Study of Water in Carbon Dioxide Microemulsions," Langmuir, Jul. 1997, 13(15):3934-3937, 4 pages.

* cited by examiner

STIMULATING HYDROCARBON RESERVOIRS

CROSS REFERENCE TO RELATED APPLICATION

This application is a divisional of, and claims priority to, U.S. patent application Ser. No. 17/829,972, filed on Jun. 1, 2022, the entire contents of which is incorporated by reference herein.

TECHNICAL FIELD

This document relates to methods and compositions used in stimulating hydrocarbon reservoirs for enhancing hydrocarbon fluid recovery.

BACKGROUND

Hydrocarbon reservoirs composed of carbonates such as calcite, dolomite and combinations thereof are typically stimulated with acids to create improved flow paths (wormholes) for oil or gas recovery. Acids are also used to stimulate carbonate, sandstone or other rock formations by mitigating damage in a near well-bore region caused naturally or induced by drilling or completion processes.

SUMMARY

This disclosure describes methods and compositions used in stimulating hydrocarbon reservoirs for enhancing hydrocarbon fluid recovery.

In an example implementation according to the present disclosure, a method for treating a hydrocarbon reservoir includes delivering a composition to the hydrocarbon reservoir. The composition includes at least one acid, and liquid or supercritical carbon dioxide ($CO_2$). The method further includes exposing the delivered composition to water to activate the composition; and treating a rock formation of the hydrocarbon reservoir with the activated composition.

In an aspect combinable with the example implementation, the at least one acid is directly dissolved in the liquid or supercritical $CO_2$.

In another aspect combinable with any of the previous aspects, the at least one acid is selected from the group consisting of acetic acid, formic acid, trifluoroacetic acid, propionic acid, 2-hydroxypropanoic acid, and 2-hydroxyhexanoic acid.

In another aspect combinable with any of the previous aspects, the at least one acid is dissolved in the liquid or supercritical $CO_2$ with a cosolvent or surfactant.

In another aspect combinable with any of the previous aspects, the at least one acid is stearic acid, and the cosolvent or surfactant is selected from the group consisting of acetic acid, acetic acid and acetonitrile, ethanol, ethanol and acetonitrile, and methyl acetate.

In another aspect combinable with any of the previous aspects, the at least one acid is p-methylbenzene sulfonic acid, and the cosolvent or surfactant is selected from the group consisting of ethyl acetate, ethyl acetate and ethanol, ethanol, and acetone.

In another aspect combinable with any of the previous aspects, the at least one acid is benzoic acid, and the cosolvent or surfactant is selected from the group consisting of ethanol, ethanol and ethyl acetate, and ethyl acetate.

In another aspect combinable with any of the previous aspects, the at least one acid is hydroxybenzoic acid, and the cosolvent or surfactant is ethanol.

In another aspect combinable with any of the previous aspects, the at least one acid is hydrofluoric acid, and the cosolvent or surfactant is pyridine.

In another aspect combinable with any of the previous aspects, the at least one acid is methanesulfonic acid, and the cosolvent or surfactant is selected from the group consisting of ethanol, acetone, and ethyl acetate.

In another aspect combinable with any of the previous aspects, the composition includes the at least one acid and the liquid or supercritical $CO_2$ in an acid-$CO_2$ emulsion with an outer continuous phase that includes the liquid or supercritical $CO_2$ and an internal phase that includes the at least one acid and a surfactant.

In another aspect combinable with any of the previous aspects, the composition includes the at least one acid and less than 30% water by volume.

In another aspect combinable with any of the previous aspects, the composition includes the at least one acid and greater than 70% liquid or supercritical $CO_2$ by volume.

In another aspect combinable with any of the previous aspects, the at least one acid includes a first acid and a second acid.

In another aspect combinable with any of the previous aspects, the first acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

In another aspect combinable with any of the previous aspects, the second acid is selected from the group consisting of acetic acid, trifluoroacetic acid, propanoic acid, formic acid, 2-hydroxypropanoic acid, and 2-hydroxyhexanoic acid.

In another aspect combinable with any of the previous aspects, the at least one acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

In another aspect combinable with any of the previous aspects, the surfactant is cationic, anionic, nonionic, or zwitterionic.

In another aspect combinable with any of the previous aspects, the surfactant includes a fluorinated surfactant that is selected from the group consisting of ammonium carboxylic acid perfluoroether; $C_7F_{15}CH(OSO_3Na^+)C_7H_{15}$; bis(1H,1H,5H-octafluoro-n-pentyl) sodium sulfosuccinate (di-HCF4); sodium 1-oxo-1-[4-(perfluorohexyl)phenyl]hexane-2-sulfonate, FC6-HC4; 1-oxo-1-[4-(perfluorohexyl)phenyl]hexane (Nohead FC6HC4); sodium 1,5bis[(1H, 1H,2H,2H-perfluorobutyl)oxy]-1,5-dioxopentane-2-sulfonate (2FG(EO)$_2$); sodium 1,5-bis[(1H, 1H,2H,2H-perfluorohexyl)oxy]-1,5dioxopentane-2-sulfonate (4FG(EO)$_2$); sodium 1,5-bis[(1H, 1H,2H,2H-perfluorodecyl)oxy]-1,5-dioxopentane-2-sulfonate (8FG(EO)$_2$); sodium 1,4-bis[(1H, 1H,2H,2H-perfluorohexyl)oxy]-1,4dioxobutane-2-sulfonate (4FS(EO)$_2$); sodium 1,4-bis[(1H, 1H, 2H,2H-perfluorodecyl)oxy]-1,4-dioxobutane-2-sulfonate (8FS(EO)$_2$), and [$C_6F_{13}$mim][(CF$_3$)$_3$S], [$C_6F_{13}$mim]-[$C_6F_{13}$S], and [$CSF_{11}$mim][$CSF_{11}$S].

In another aspect combinable with any of the previous aspects, the surfactant includes a nonfluorinated surfactant that is a poly(ethylene glycol) 2,6,8-trimethyl-4-nonyl ether.

In another aspect combinable with any of the previous aspects, the acid-$CO_2$ emulsion further includes an emulsion stabilizer that includes a plurality of solid particles.

In another aspect combinable with any of the previous aspects, the plurality of solid particles include insoluble solid material.

In another aspect combinable with any of the previous aspects, the insoluble solid material is selected from the group consisting of clays, surface-modified clay-based materials, zeolites, nanoparticles, and hybrid organic-inorganic materials.

In another aspect combinable with any of the previous aspects, the composition includes the at least one acid and the liquid or supercritical $CO_2$ in an acid-$CO_2$ foam with an outer continuous phase that includes water and an internal phase that includes the at least one acid and the liquid or supercritical $CO_2$.

In another aspect combinable with any of the previous aspects, the composition includes the at least one acid and greater than 50% liquid or supercritical $CO_2$ by volume.

In another aspect combinable with any of the previous aspects, the composition includes less than 50% water by volume.

In another aspect combinable with any of the previous aspects, the at least one acid includes a first acid in the internal phase and a second acid in the outer continuous phase.

In another aspect combinable with any of the previous aspects, the first acid is selected from the group consisting of acetic acid, trifluoroacetic acid, propanoic acid, formic acid, 2-hydroxypropanoic acid, and 2-hydroxyhexanoic acid.

In another aspect combinable with any of the previous aspects, the second acid is selected from the group consisting of HCl, a strong mineral acid, HF, a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

In another aspect combinable with any of the previous aspects, exposing the delivered composition to water includes at least one of exposing the delivered composition to subterranean water in the hydrocarbon reservoir; or delivering the water to the hydrocarbon reservoir separately from the delivered composition to expose the delivered composition to the water.

In another aspect combinable with any of the previous aspects, delivering the composition includes delivering the composition in a first fluid slug.

Another aspect combinable with any of the previous aspects further includes delivering, in a second fluid slug subsequent to the first fluid slug, another acid to the hydrocarbon reservoir that is independent of the liquid or supercritical $CO_2$.

Another aspect combinable with any of the previous aspects further includes delivering a spacer to the hydrocarbon reservoir between the first and second fluid slugs.

Another aspect combinable with any of the previous aspects further includes delivering a pre-flush to the hydrocarbon reservoir prior to delivering the composition to the hydrocarbon reservoir; and delivering a post-flush to the hydrocarbon reservoir subsequent to delivering the composition to the hydrocarbon reservoir.

Another aspect combinable with any of the previous aspects further includes diverting the delivered composition to a particular location in the hydrocarbon reservoir.

Implementations according to the present disclosure may include one, some, or all of the following features. For example, implementations according to the present disclosure can attenuate a reaction rate between an acid and a rock matrix by dispersing or dissolving the acid in a $CO_2$ phase. Implementations according to the present disclosure can also reduce an acid activity of a $CO_2$-acid system that combines with water in the rock formation or from a pumped fluid. Example implementations of the present disclosure can also facilitate ease of pumping of a composition to a desired location in a rock formation with minimal pressure loss due to friction. In addition, implementations according to the present disclosure can utilize $CO_2$ that has a high diffusivity and can penetrate deep into the rock formation to extend a depth of stimulation in an acid job.

The following units of measure have been mentioned in this disclosure:

| Unit of Measure | Full form |
| --- | --- |
| cm | centimeter |
| mL | milliliter |
| mmol | millimole |
| psi | pounds per square inch |
| ° C. | degrees Celsius |

The details of one or more implementations of the disclosure are set forth in the accompanying drawings and the description that follows. Other features, objects, and advantages of the disclosure will be apparent from the description and drawings, and from the claims.

DETAILED DESCRIPTION

This disclosure describes methods and compositions used in stimulating hydrocarbon reservoirs for enhancing hydrocarbon fluid recovery. More specifically, the present disclosure discusses example techniques (e.g., compositions and methods of delivery thereof) for attenuating a reaction rate between an acid and a rock matrix by dispersing or dissolving the acid in a $CO_2$ phase. In some aspects, by segregating the acid from water, an acid activity is reduced or eliminated until the $CO_2$-acid system combines with water in the rock formation or from a pumped fluid. Example implementations of the present disclosure include the provision of alternative low-viscosity acid systems, which can facilitate ease of pumping of a composition to a desired location in a rock formation with minimal pressure loss due to friction (as opposed to, for example, dispersing acid in diesel to form an emulsion, which has a high viscosity and hence friction when pumping). In addition, $CO_2$ can have a high diffusivity and can penetrate deep into the rock formation to extend the depth of stimulation in an acid job.

Such example techniques can address and overcome limitations and problems associated with conventional acid jobs. For example, hydrochloric acid (HCl) is the most common acid used to stimulate carbonate formations. This selection is primarily driven by its cost-effectiveness and proven success and efficiency towards dissolving calcium and magnesium-based carbonates. Additionally, the reaction products are readily soluble in water which is advantageous for formation damage prevention. Several limitations with HCl have been noted. For example, HCl rapidly reacts with the rock matrix, particularly at elevated temperatures, and as a result, large volumes of acid are required to stimulate the pay zone, and deep penetration of the acid is difficult to achieve. Other drawbacks include various safety concerns associated with the transfer and handling of highly corrosive acids at the well site, as well as undesired acid reactions occurring with surface equipment and near the wellbore, causing corrosion and damage to downhole equipment, metal tubulars, and casing.

As another example, strategies have been proposed to address the limitations with HCl such as emulsifying the acid in a hydrocarbon phase to create a temporary physical barrier to slow the reaction with the rock. However, emulsification or gelling of HCl for retarding the acid involves cumbersome mixing procedures, stability concerns, high friction pressures during pumping, and potential for formation damage. Other acid systems proposed include organic acids/synthetic acids and stimuli-responsive acid-generating systems. These systems do overcome some of the challenges associated with using HCl; however, limitations still exist, particularly with respect to low dissolving power and solubility, high friction pressures, formation damage and high cost.

Also, some conventional acid jobs use methanesulfonic acid (HOMs) for its potential to replace mineral acid systems for use in subterranean reservoir stimulation applications, e.g., scale removal and matrix/acid fracturing applications. HOMs in the concentrated form (>70%) is not readily reactive with the rock matrix. This can be envisioned as a pathway to achieve the desired attenuation behavior given a suitable pumping sequence; however, it can be difficult to control in the subterranean environment due to the abundance of water. Furthermore, delivery in traditional emulsion form, i.e. acid-in-diesel, is limited by high friction pressures and quality control concerns as noted.

Example compositions according to the present disclosure include acid-in-$CO_2$ compositions formed from a variety of example techniques. An example technique can include dissolving an acid in $CO_2$ directly or assisted by cosolvent(s), surfactant(s), or both. Another example technique can include preparing single or double emulsions that include microemulsions, in which case surfactant(s), particles, or both are used to form an acid-in-$CO_2$ emulsion (e.g., droplets of HCl/water dispersed in a continuous phase of $CO_2$ that also contains an acid). Another example technique can include preparing an acid-based $CO_2$ foam system, where water is a continuous phase and suitable surfactants are selected to enable stability of the as-prepared foam under reservoir conditions. The example techniques can take advantage of the insight that certain compositions are useful for controlled preparation of an acid capable of stimulating carbonate formations at a desirable time and/or location, thus favoring deeper penetration of an acid and/or use of less acid than previous methods. Moreover, the use of $CO_2$ can take advantage of recent and future developments in direct air capture (DAC) of $CO_2$, which may continue to increase over the coming decades, and large quantities of $CO_2$ will be available for utilization. Injection of supercritical $CO_2$ into subterranean formations can ultimately lead to some $CO_2$ trapping and sequestration which is also of benefit. Furthermore, as ground water supply is depleted in many regions of the world, use of $CO_2$ can be an important alternative.

The example techniques also take advantage of the insight that there are a limited number of acids that can be dissolved directly in $CO_2$. Strong mineral acids are typically highly polar or ionic and dissolve well in water but not in $CO_2$ such as hydrochloric acid. In example implementations, an acid can be dissolved in supercritical $CO_2$ and used for subterranean rock stimulation. The range of acids that could be directly dissolved in $CO_2$ are expanded by the example techniques of the present disclosure by adding a polar cosolvent. The example techniques also rely on innovative methods for delivering these types of $CO_2$-acid systems to the formation as described in the present disclosure. Some of these methods include delivering acid segregated from water using surfactants in order to form foams, dispersions. or emulsions.

Figure 1:
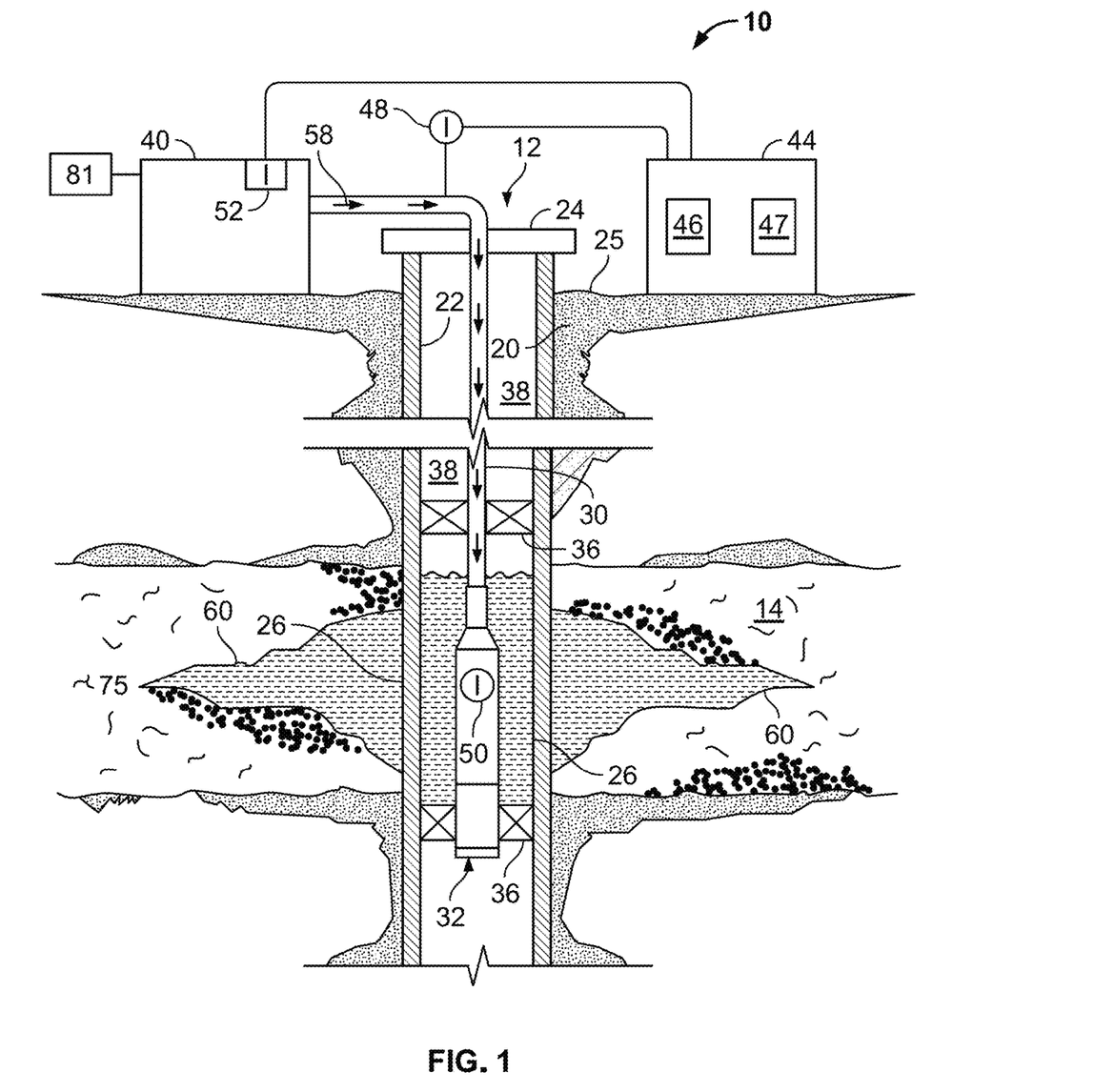
FIG. 1 shows an example of an acid treatment for a well.

FIG. 1 illustrates an example of an acid treatment 10 for a well 12. The well 12 can be associated with a reservoir or formation 14, for example, an unconventional reservoir in which recovery operations in addition to conventional recovery operations are practiced to recover trapped hydrocarbons. Examples of unconventional reservoirs include rock formations that include tight carbonates such as calcite, dolomite, and combinations thereof. In some implementations, the formation 14 includes an underground formation containing hydrocarbons (for example, oil, gas, or both). In some implementations, the well 12 can intersect other suitable types of formations 14, including reservoirs that are naturally fractured or not naturally fractured in any significant amount.

The well 12 can include a wellbore 20, casing 22 and well head 24. The wellbore 20 can be a vertical or deviated bore. The casing 22 can be cemented or otherwise suitably secured in the wellbore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the acid treatment 10, a work string 30 can be disposed in the wellbore 20. The work string 30 can be coiled tubing, sectioned pipe or other suitable tubing. A delivery tool 32 can be coupled to an end of the work string 30. Packers 36 can seal an annulus 38 of the wellbore 20 above and below the formation 14. Packers 36 can be mechanical, fluid inflatable or other suitable packers.

One or more pumps 40 can be coupled to the work string 30 at the surface 25. The pumps 40 pump an acid composition 58 down the work string 30 to perform the acid treatment 10 and generate openings 60 (e.g., a wormhole or multiple wormholes). The pumps 40 can include mobile vehicles, equipment such as skids or other suitable structures.

One or more instruments 44 can also be provided at the surface 25. The instruments 44 can include an acid control system 46 and an acid treatment simulator 47. The acid control system 46 monitors and controls the acid treatment 10. The acid control system 46 can control the pumps 40 and fluid valves to stop and start the acid treatment 10 as well as to fluidly mix (with valves) multiple fluids that are part of the acid treatment 10. The acid control system 46 communicates with surface and subsurface instruments to monitor and control the acid treatment 10. In some implementations, the surface and subsurface instruments may include surface sensors 48, down-hole sensors 50 and pump controls 52.

The acid treatment 58, generally is comprised of an acid-in-$CO_2$ composition as previously described. The present disclosure contemplates three example acid-in-$CO_2$ compositions that can be used for the acid treatment 58 for matrix stimulation as well as acid fracturing techniques in formations that contain carbonates such as calcite, dolomite, siderite, or a mix, as well as reservoirs that contain predominantly silicates such as sandstone or clays or may be a mixture of carbonates and silicates. In some aspects, the example acid-in-$CO_2$ compositions can be used for matrix acidizing and acid fracturing well formation to improve injectivity in water injectors or disposal wells and not only with oil and gas production wells to improve the well productivity.

Acid-In-$CO_2$ Composition Example #1

A first example composition can include dissolving an acid in $CO_2$ directly or assisted by cosolvent(s), surfactant(s), or both. For instance, this example composition can be formed by direct dissolution of an acid in $CO_2$ (e.g., liquid or supercritical phase). As another instance, this example composition can be formed by dissolution of the acid in a cosolvent-modified $CO_2$ (e.g., liquid or supercritical phase).

In the direct dissolution example, one or more acids can be dissolved directly in liquid or supercritical $CO_2$. For example, the dissolution mechanism can include hydrogen bonding between acid molecules, as well as Lewis acid-base interactions with the $CO_2$. Example acids that can be used in this composition example can include acetic acid, which has elevated solubility in supercritical $CO_2$ (and can also serve as a cosolvent to dissolve other materials in $CO_2$). As other examples, formic acid, trifluoroacetic acid, and propionic acid dissolve directly in supercritical $CO_2$. As further examples, 2-hydroxypropanoic acid (lactic acid) and 2-hydroxyhexanoic acid dissolve in supercritical $CO_2$.

In the indirect dissolution example, some organic acids can be dissolved in $CO_2$ with the aid of a polar cosolvent. For example, stearic acid can dissolve in supercritical $CO_2$ with the following single or dual cosolvent systems: acetic acid, acetic acid and acetonitrile, ethanol, ethanol and acetonitrile, or methyl acetate. As another example, p-methylbenzene sulfonic acid can dissolve in supercritical $CO_2$ directly, but its solubility is enhanced through inclusion of ethyl acetate, ethyl acetate and ethanol, ethanol, or acetone. As a further example, benzoic acid dissolves in supercritical $CO_2$ with ethanol, ethanol and ethyl acetate, or ethyl acetate as cosolvents. As yet another example, hydroxybenzoic acid dissolves in supercritical $CO_2$ with ethanol as a cosolvent. Also, hydrofluoric acid dissolves in supercritical $CO_2$ with pyridine as a cosolvent. Further, methanesulfonic acid (HOMs) dissolves in supercritical $CO_2$ with various cosolvents.

Figure 2:
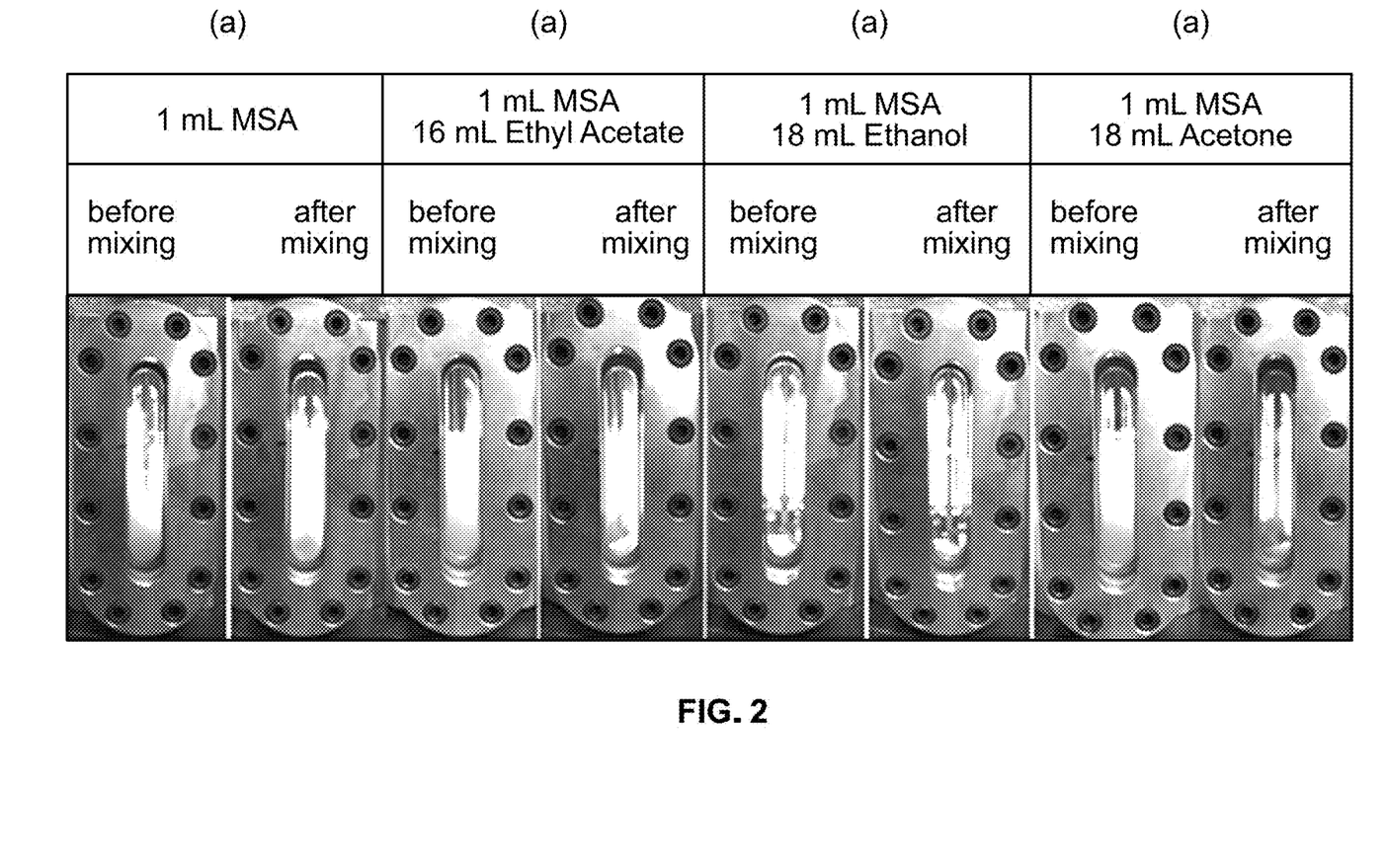
FIG. 2 shows several digital representations of miscibility experiments performed for methanesulfonic acid in the presence of liquid carbon dioxide ($CO_2$) and a cosolvent.

Turning to FIG. 2, this figure shows images of compositions that consist of HOMs and cosolvent before and after mixing in examples (a)-(d). Thus, FIG. 2 shows digital representation for each of the miscibility experiments performed for HOMs in the presence of liquid $CO_2$ ($LCO_2$) and cosolvent(s). The image to the left of each example, (a)-(d), represents the appearance upon immediate contact with $LCO_2$, while the image to the right is after stirring for a duration of 15 minutes.

The miscibility of HOMs (98%) in $LCO_2$ was evaluated under ambient temperature conditions. As shown in FIG. 2, example (a), the acid is not miscible in $LCO_2$ under these conditions as evidenced by the cloudy appearance of the fluid upon mixing $LCO_2$. Accordingly, cosolvents such as ethyl acetate (example (b)), ethanol (example (c)), and acetone (example (d)) were introduced to the system. As shown in FIG. 2, combining ethanol with HOMs in a ratio of 1:18 led to full miscibility with $LCO_2$ under these conditions and serves as proof-of-concept for these examples.

Acid-In-$CO_2$ Composition Example #2

Another example technique can include preparing single or double emulsions (both referred to as an "emulsion") that include microemulsions, in which case surfactant(s), particles, or both are used to form an acid-in-$CO_2$ emulsion (e.g., droplets of HCl/water dispersed in a continuous phase of $CO_2$ that also contains an acid). For example, in these examples, $CO_2$ forms an outer continuous phase (optionally containing a $CO_2$-soluble acid), while water/acid form an internal phase. The composition can be, e.g. nominally: (1) volumetrically <30% water containing an acid #1; volumetrically >70% $CO_2$ with an acid #1, or an acid #1 and an acid #2; or volumetrically <0.05-5% surfactant and/or amphiphilic block co-polymer or solid particles to impart emulsion stability. Other additives such as a scale inhibitor, a corrosion inhibitor, an iron control agent, an antisludging agent, or a fluid loss agent can be included. The water can also contain a viscosifier such as polysaccharide (e.g., guar) or a friction reducer.

Figure 3A:
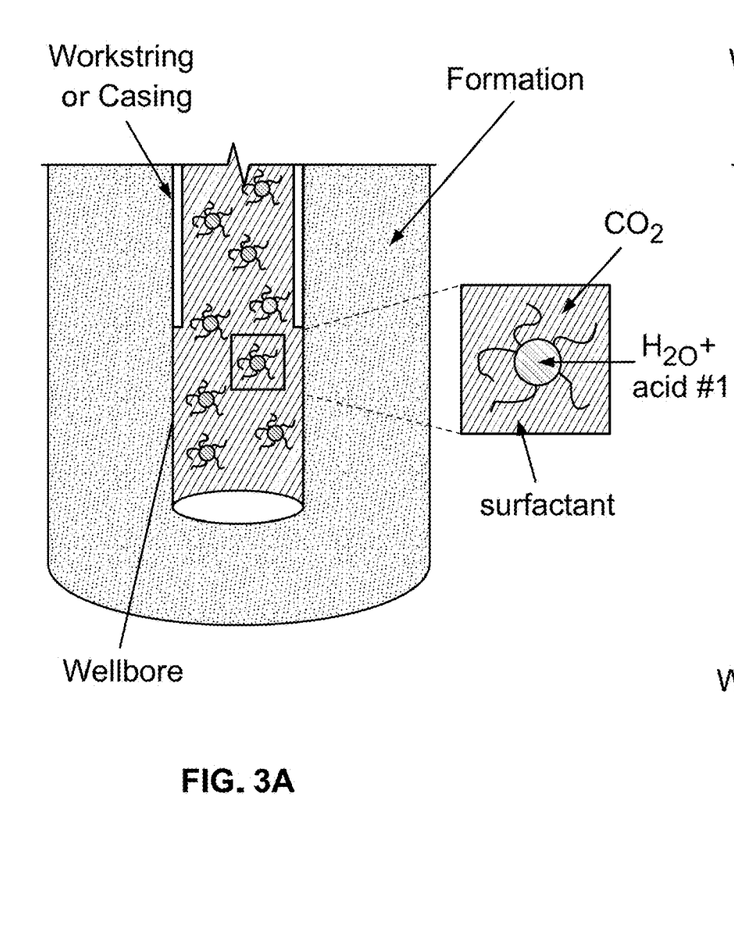
FIGS. 3A-3B are schematic diagrams of a composition of an acid-in-$CO_2$ emulsion for an acid treatment according to the present disclosure.

FIG. 3A shows a schematic of an emulsion design, which demonstrates an internal aqueous phase containing acid, an external $CO_2$ carrier phase, and interfacial surfactant according to an example acid-in-$CO_2$ composition within a wellbore according to this technique. Here, FIG. 3A shows a composition that is volumetrically >70% $CO_2$ with an acid #1. In this example, the acid #1 can be selected from a group containing: HCl, strong mineral acids, HF, sulfonic acids such as methanesulfonic acid, ethanesulfonic acid, p-toluene sulfonic acid, formic acid, lactic acid, acetic acid, propanoic acid, 2-hydroxypropanoic acid (lactic acid), and 2-hydroxyhexanoic acid.

Figure 3B:
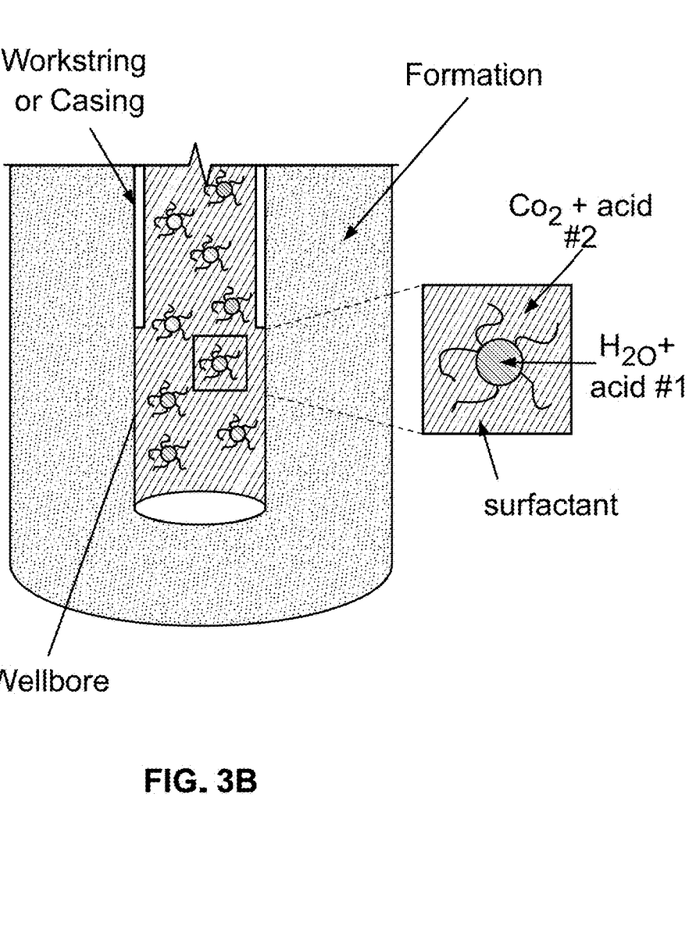

FIG. 3B shows a schematic of another emulsion design. Here, FIG. 3B shows a composition that is volumetrically >70% $CO_2$ with an acid #1 and an acid #2. In this example, the acid #1 can be selected from a group containing: HCl, strong mineral acids, HF, sulfonic acids such as methanesulfonic acid, ethanesulfonic acid, p-toluene sulfonic acid, formic acid, lactic acid, acetic acid, propanoic acid, 2-hydroxypropanoic acid (lactic acid), and 2-hydroxyhexanoic acid. The acid #2 can be selected from a group containing: acetic acid, trifluoroacetic acid, propanoic acid, formic acid, 2-hydroxypropanoic acid (lactic acid), and 2-hydroxyhexanoic acid.

In both of the examples of FIGS. 3A-3B, a surfactant is used, which results in an emulsion with $CO_2$ as the continuous phase. In these examples, the surfactant can be cationic, anionic, nonionic, or zwitterionic. The surfactant to make the water-in-$CO_2$ emulsion can be fluorinated as in the following examples: ammonium carboxylic acid perfluoroether; $C_7F_{15}CH(OSO_3Na^+)C-H_{15}$; bis(1H,1H,5H-octafluoro-n-pentyl) sodium sulfosuccinate (di-HCF4); sodium 1-oxo-1-[4-(perfluorohexyl)phenyl]hexane-2-sulfonate, FC6-HC4; 1-oxo-1-[4-(perfluorohexyl)phenyl]hexane (Nohead FC6HC4); sodium 1,5bis[(1H, 1H,2H,2H- perfluorobutyl)oxy]-1,5-dioxopentane-2-sulfonate (2FG(EO)$_2$); sodium 1,5-bis[(1H,1H,2H,2H-perfluorohexyl)oxy]-1,5dioxopentane-2-sulfonate (4FG(EO)$_2$); sodium 1,5-bis[(1H,1H,2H,2H-perfluorodecyl)oxy]-1,5-dioxopentane-2-sulfonate (8FG(EO)$_2$); sodium 1,4-bis[(1H,1H,2H,2H-perfluorohexyl)oxy]-1,4dioxobutane-2-sulfonate (4FS(EO)$_2$); or sodium 1,4-bis[(1H,1H,2H,2H-perfluorodecyl)oxy]-1,4-dioxobutane-2-sulfonate (8FS(EO)$_2$).

Figure 4:
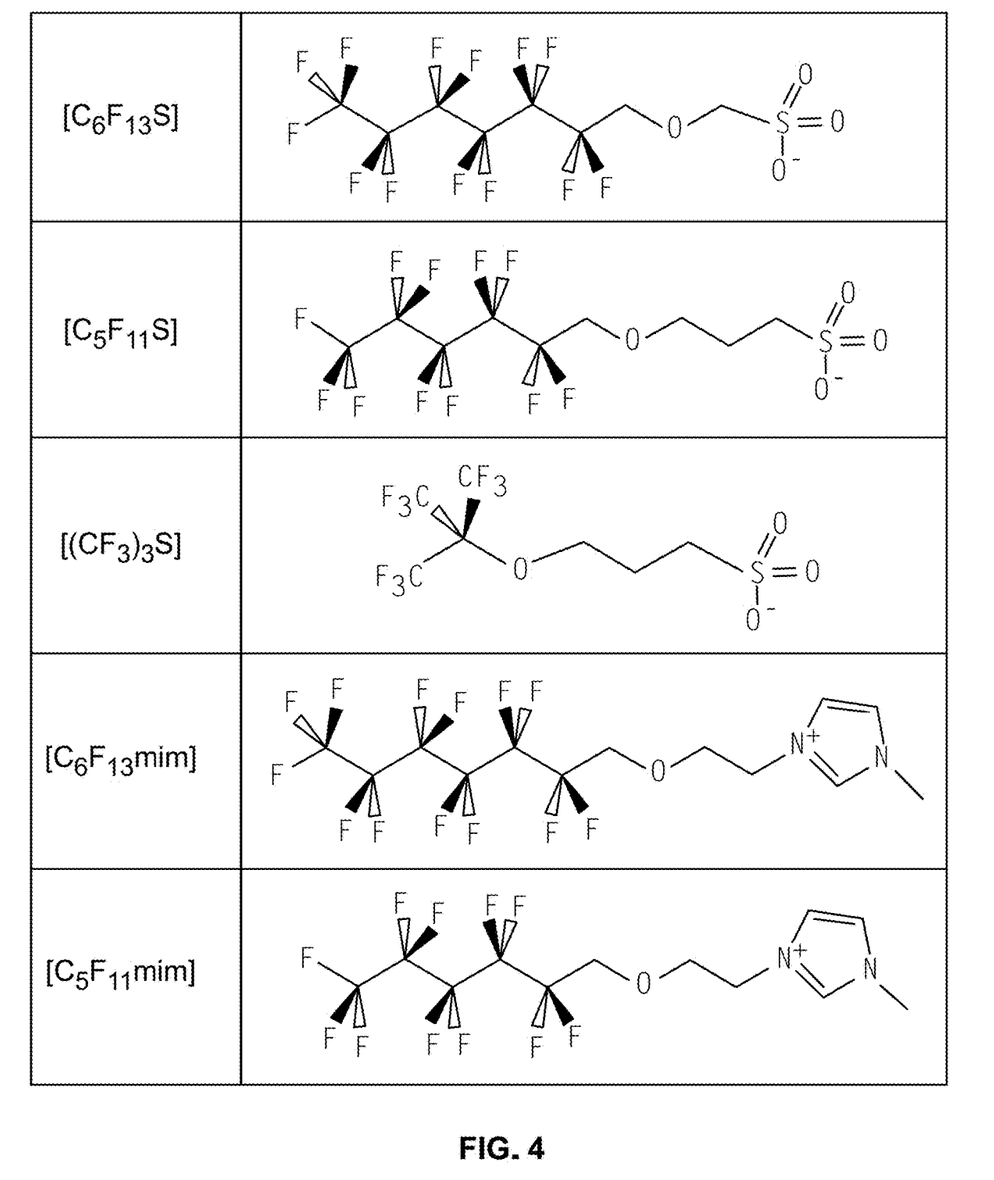
FIG. 4 shows example structures for a surfactant for a water-in-$CO_2$ foam or emulsion for an acid treatment according to the present disclosure.

As another example, the surfactant to make the water-in-$CO_2$ emulsion can be fluorinated by [C$_6$F$_{13}$mim][(CF$_3$)$_3$S], [C$_6$F$_{13}$mim]-[C$_6$F$_{13}$S], and [C$_6$F$_{11}$mim][C$_6$F$_{11}$S], which are shown in FIG. 4. FIG. 4 shows example structures for this surfactant.

In the compositions of Example #2, the surfactant to make the water-in-$CO_2$ foam or emulsion can also be nonfluorinated as in the case of poly(ethylene glycol) 2,6,8-trimethyl-4-nonyl ethers such as octa(ethylene glycol) 2,6,8-trimethyl-4-nonyl ether (5b-C$_{12}$E$_8$). The amphiphilic block-copolymer can be fluorinated or non-fluorinated as in the case of F(CF$_2$CF$_2$)$_{3-8}$CH$_2$CH$_2$O(CH$_2$CH$_2$O)$_{10-15}$H and Poly(ethylene oxide)-b-poly(butylene oxide), respectively.

Alternatively, solid particles can be used to create the emulsion, whether solely or utilized in conjunction with surfactants. Examples of the solid particles can include the addition of suitable functional materials such as any insoluble solid material or dispersion capable of stabilizing the acid emulsions. For example, the functional frameworks can serve as emulsion stabilizers by preferentially adsorbing at the oil-water interface, which reduces the interfacial tension of the droplets and offers enhanced stability. Functional frameworks suitable for use in the present example composition can be less than 20 microns. In example embodiments, functional frameworks suitable for can be nano-sized, for example less than 1000 nm. The functional framework can include clays, surface-modified clay-based materials, zeolites, nanoparticles, and hybrid organic-inorganic materials, or combinations thereof.

Acid-In-CO2 Composition Example #3

Another example technique can include preparing an acid-based $CO_2$ foam system, where water is a continuous phase and suitable surfactants are selected to enable stability of the as-prepared foam under reservoir conditions. For instance, in this example, water forms an outer continuous phase (optionally containing an acid), and the acid-in-$CO_2$ forms an internal phase. The composition of the foam can be nominally: volumetrically >50% $CO_2$ containing an acid #1; volumetrically <50% water either with no acid or an acid #2; or volumetrically <0.05-5% surfactant and/or amphiphilic block co-polymer. Other additives such as scale inhibitor, corrosion inhibitor, iron control agent, antisludging agent, fluid loss agent, and otherwise can be included in the emulsion. In some examples, water can also contain a viscosifier such as polysaccharide (e.g., guar) or a friction reducer. A crosslinked aqueous fluid can also be used, e.g., guar crosslinked with borate, zirconium, titanium, and other ions.

Figure 5A:
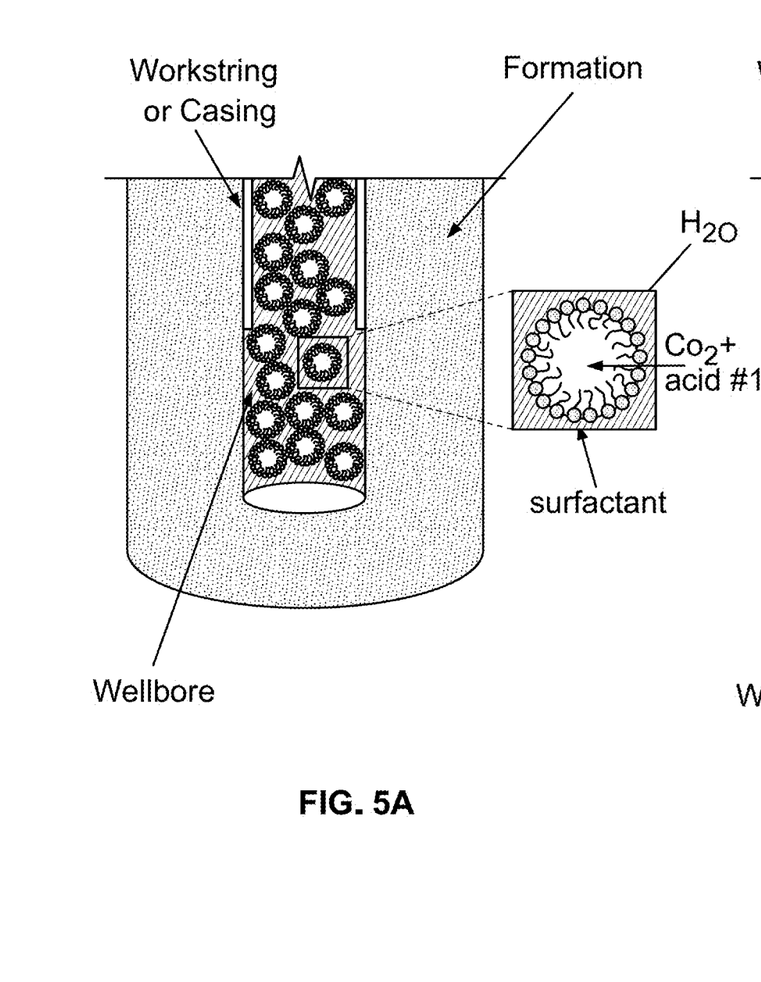
FIGS. 5A-5B are schematic diagrams of a composition of a $CO_2$-in-acid foam according to the present disclosure.

FIG. 5A shows a schematic of a foam design, which demonstrates the internal gas phase, external aqueous phase, and interfacial surfactant according to an example acid-in-$CO_2$ composition within a wellbore according to this technique. Here, FIG. 5A shows a composition that is volumetrically <50% water with no acid. In this example, the acid #1 (of the internal phase) can be selected from a group containing: acetic acid, trifluoroacetic acid, propanoic acid, formic acid, 2-hydroxypropanoic acid (lactic acid), and 2-hydroxyhexanoic acid.

Figure 5B:
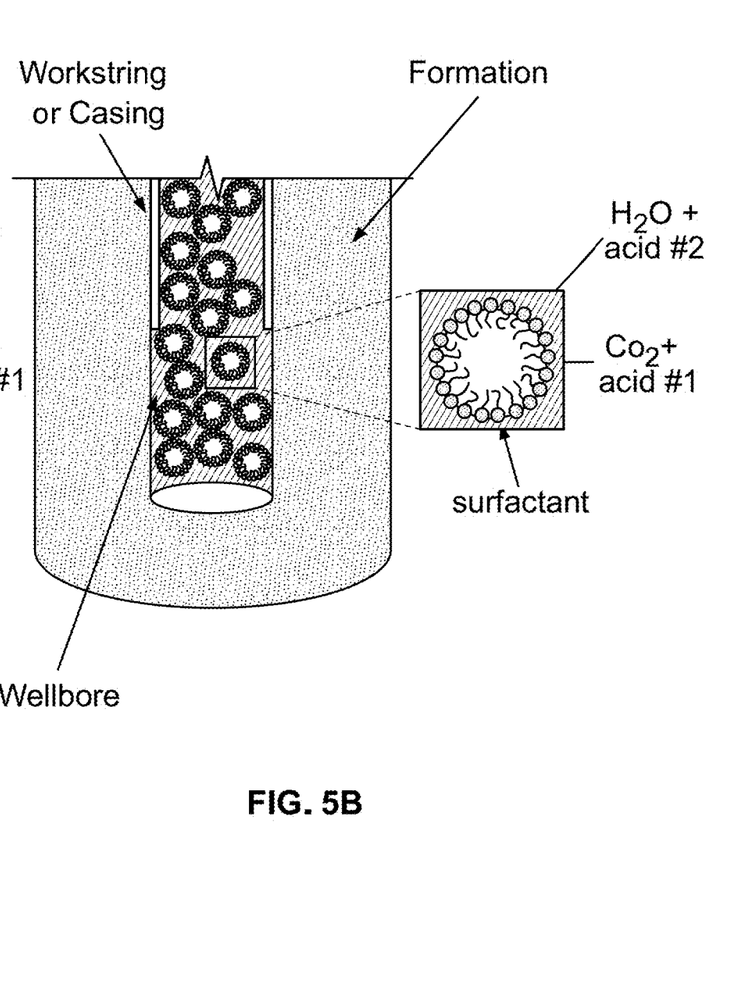

FIG. 5B shows a schematic of another foam design. Here, FIG. 5B shows a composition that is volumetrically <50% water with an acid #2. In this example, the acid #2 can be selected from a group containing: HCl, strong mineral acids, HF, sulfonic acids such as methanesulfonic acid, ethanesulfonic acid, p-toluene sulfonic acid, formic acid, lactic acid, acetic acid, propanoic acid, 2-hydroxypropanoic acid (lactic acid), and 2-hydroxyhexanoic acid.

In the compositions of Example #3, the surfactant can be a cationic, anionic, nonionic, or zwitterionic compound. The compound can have the following properties, resulting in a foam with an aqueous continuous phase: betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, and other similar compounds. Suitable surfactants include, for example. polyethylene glycols, ethers of alkylated phenol, sodium dodecylsulfate, alpha olefin sulfonates such as sodium dodecane sulfonate and trimethyl hexadecyl ammonium bromide. In some aspects, the surfactants can be added in concentrations which range typically from about 0.05 to about 2 percent of the liquid component by weight (from about 0.5 to about 20 gallons per 1000 gallons of liquid).

Turning back to FIG. 1, the compositions described in Examples #1-3 can be introduced into a subterranean formation as the acid composition 58 in acid treatment 10 for the well 12 to treat the reservoir or formation 14 in example delivery methods. The acid treatment 10 (including acid composition 58) can be formed and delivered by the acid control system 46 (with the pumps 40, work string 30, and delivery tool 32, among other components, collectively, the "acid delivery system"). In some aspects, the acid treatment 10 can be delivered to the formation 14 so as to delay acid formation for deeper stimulation of oil and gas wells drilled in carbonate and sandstone reservoirs based on the formulation of the acid composition 58 according to Examples #1-3. The acid in the acid composition 58 is delivered in a $CO_2$-phase, where its activity is reduced or eliminated until it mixes with water in the formation 14. Such delay features can be accomplished with the acid treatment 10 according to the following example delivery techniques.

In an example delivery method performed by the acid delivery system, a composition of at least one acid and liquid or supercritical carbon dioxide ($CO_2$) can be delivered (e.g., circulated, pumped) to a hydrocarbon reservoir, such as the formation 14, through the work string 30. Next, the delivered composition can be exposed to water to activate the composition (e.g., bring the water into contact with at least one acid). Next, the activated composition can treat a rock formation of the hydrocarbon reservoir.

In aspects of the example delivery method with the acid delivery system, the pumps 40 can be controlled to circulate two fluids separately into the work string 30 and allow mixing on a pore scale in the formation 14. A first fluid includes $CO_2$ (liquid or supercritical) that has been premixed with an acid. The second fluid includes (or is) water. In this example, each system can be pumped separately in the form of separate stages into the work string 30 separated by a spacer (e.g., a neutral fluid, such as water, that prevents mixing of the first and second fluids during pumping). The two fluids do not mix in the work string 30 (or wellbore), but the mixing process will happen in the pore spaces of the rock formation 14. Upon mixing in the formation 14, the acid in the $CO_2$ phase is activated by the water. Suitable acids for this example delivery technique can include acetic acid, trifluoroacetic acid, propanoic acid, formic acid, 2-hydroxypropanoic acid (lactic acid), and 2-hydroxyhexanoic acid.

In some aspects of this example delivery method, the $CO_2$ phase with acid also contains a cosolvent. Acids suitable for combining with a cosolvent include citric acid, stearic acid, benzoic acid, HF, sulfonic acids such as methanesulfonic acid, ethanesulfonic acid, and p-toluene sulfonic acid. Cosolvents suitable for aiding in the dissolution of the acid include alcohols (methanol, ethanol, propanol), esters (ethyl acetate, ethyl lactate), pyridine, acetic acid, acetonitrile, and acetone.

In some aspects of this example delivery method, the water phase also contains HCl or organic acid for better and deeper penetration, including deeper wormholes for matrix acidizing and better surface etching for acid fracturing applications.

In some aspects of this example delivery method, the pumps 40 can be controlled to alternately circulate a $CO_2$/acid fluid or a $CO_2$/acid/cosolvent fluid. A first fluid slug can include $CO_2$ and an acid which are mixed at the surface (e.g., at the wellbore just prior to delivery) and then pumped into the work string 30. This first fluid slug is followed by a second fluid slug of a conventional acid treatment (i.e., not an acid-in-$CO_2$ composition) from one of the following: HCl, organic acid, emulsified HCl, emulsified organic acid, chelating agent, gelled acid or crosslinked gelled acid. The first stage of pumping the $CO_2$ with acid is to deliver acid (in an acid-in-$CO_2$ composition) deep into the formation before it reacts to optimally stimulate the reservoir.

In some aspects of this example delivery method, a preflush can be implemented to reduce the oil concentration around the wellbore 20 and to prepare the formation 14 to receive the acid. In some aspects, the preflush can be used to remove organic precipitate, adjust the water salinity, mitigate asphaltene and hydrogen sulfide generation, inhibit iron sulfide precipitation, or a combination thereof. The preflush can be composed of $CO_2$ or $CO_2$ and solvent. In some aspects, the $CO_2$, acid, and cosolvent may be sufficient to reduce the oil concentration around the wellbore 20 and clean the precipitates.

In some aspects of this example delivery method, a post-flush can be used to push the treatment deeper into the reservoir, allow acid to spend, and then control the pH of the flowback fluid.

In some aspects of this example delivery method, the $CO_2$ can be mixed with acid directly and pumped to penetrate deeper into the reservoir and improve the outcome of the stimulation treatment.

In some aspects of this example delivery method, the acid composition 58 can be bullheaded directly through the tubing to the formation through the preformation system. Further, in examples where the work string 30 is coiled tubing, the coiled tubing can be used to place and directly spot the acid composition 58 into the formation.

In some aspects of this example delivery method, diverters can be used. For example, mechanical diverters, such as ball sealers, packers, plugs, nozzles, or combinations thereof can be used to spot the acid composition 58 in a particular part of formation 14. Chemical diverters, such as crosslinked acid systems, gelled acid system, use of solid acids like polylactic acid, or combinations thereof can also be used to place the acid composition 58 in a particular part of formation 14.

In some aspects of this example delivery method, precursors of the acid composition 58 can be mixed with solid acids to achieve, e.g., deeper acid penetration. In some aspects, the precursors can be mixed with degradable balls for acid diversion in heterogeneous formations. In some aspects, can be combined with any isolation technique, such as mechanical or chemical.

One, some, or all of the following terms may be used in the present disclosure with the provided meanings. The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "cosolvent" as used in this disclosure refers to a substance that is added to a mixture of two or more separate substances that are typically immiscible, in order to make them mixable.

The term "downhole" as used in this disclosure refers to under the surface of the earth, such as a location within or fluidly connected to a wellbore.

As used in this disclosure, the term "fluid" refers to liquids and gels, unless otherwise indicated.

As used in this disclosure, the term "subterranean material" or "subterranean zone" or (hydrocarbon reservoir" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact with the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

A number of implementations of the disclosure have been described. Nevertheless, it will be understood that various modifications may be made without departing from the spirit and scope of the disclosure.

What is claimed is:
1. A method for treating a hydrocarbon reservoir, comprising:
    delivering a composition to the hydrocarbon reservoir, the composition comprising:
        at least one acid, and
        liquid or supercritical carbon dioxide ($CO_2$);

exposing the delivered composition to water to activate the composition; and treating a rock formation of the hydrocarbon reservoir with the activated composition, wherein the composition comprises the at least one acid and the liquid or supercritical $CO_2$ in an acid-$CO_2$ emulsion that is exclusive of nanoparticles and comprises an outer continuous phase that comprises the liquid or supercritical $CO_2$ and an internal phase that comprises the at least one acid and a surfactant.

2. The method of claim 1, wherein the at least one acid comprises a first acid and a second acid.

3. The method of claim 2, wherein the first acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid, and the second acid is selected from the group consisting of acetic acid, trifluoroacetic acid, propanoic acid, formic acid, 2-hydroxypropanoic acid, and 2-hydroxyhexanoic acid.

4. The method of claim 1, wherein the at least one acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

5. The method of claim 1, wherein the surfactant comprises a fluorinated surfactant that is selected from the group consisting of ammonium carboxylic acid perfluoroether; $C_7F_{15}CH(OSO_3Na^+)C_7H_{15}$; bis(1H,1H,5H-octafluoro-n-pentyl) sodium sulfosuccinate (di-HCF4); sodium 1-oxo-1-[4-(perfluorohexyl)phenyl]hexane-2-sulfonate, FC6-HC4; 1-oxo-1-[4-(perfluorohexyl)phenyl]hexane (Nohead FC6HC4); sodium 1,5bis[(1H, 1H,2H,2H-perfluorobutyl)oxy]-1,5-dioxopentane-2-sulfonate (2FG(EO)$_2$); sodium 1,5-bis[(1H, 1H,2H,2H-perfluorohexyl)oxy]-1,5dioxopentane-2-sulfonate (4FG(EO)$_2$); sodium 1,5-bis[(1H, 1H,2H,2H-perfluorodecyl)oxy]-1,5-dioxopentane-2-sulfonate (8FG(EO)$_2$); sodium 1,4-bis[(1H, 1H,2H,2H-perfluorohexyl)oxy]-1,4dioxobutane-2-sulfonate (4FS(EO)$_2$); sodium 1,4-bis[(1H, 1H,2H,2H-perfluorodecyl)oxy]-1,4-dioxobutane-2-sulfonate (8FS(EO)$_2$), and [$C_6F_{13}$mim][(CF$_3$)3S], [$C_6F_{13}$mim]-[$C_6F_{13}$S], and [$C_5F_{11}$mim][$C_5F_{11}$S].

6. The method of claim 1, wherein the surfactant comprises a nonfluorinated surfactant that is a poly(ethylene glycol) 2,6,8-trimethyl-4-nonyl ether.

7. The method of claim 1, further comprising:
delivering a pre-flush to the hydrocarbon reservoir prior to delivering the composition to the hydrocarbon reservoir; and
delivering a post-flush to the hydrocarbon reservoir subsequent to delivering the composition to the hydrocarbon reservoir.

8. The method of claim 1, further comprising diverting the delivered composition to a particular location in the hydrocarbon reservoir.

9. A method for treating a hydrocarbon reservoir, comprising:
delivering a composition to the hydrocarbon reservoir, the composition comprising:
at least one acid, and
liquid or supercritical carbon dioxide ($CO_2$);
delivering water to the hydrocarbon reservoir separately from the composition to activate the composition; and treating a rock formation of the hydrocarbon reservoir with the activated composition, wherein the composition comprises the at least one acid and the liquid or supercritical $CO_2$ in an acid-$CO_2$ emulsion that is exclusive of nanoparticles and comprises an outer continuous phase that comprises the liquid or supercritical $CO_2$ and an internal phase that comprises the at least one acid and a surfactant.

10. The method of claim 9, wherein the at least one acid comprises a first acid and a second acid, and wherein the first acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid, and the second acid is selected from the group consisting of acetic acid, trifluoroacetic acid, propanoic acid, formic acid, 2-hydroxypropanoic acid, and 2-hydroxyhexanoic acid.

11. The method of claim 9, wherein the at least one acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

12. The method of claim 9, wherein the surfactant comprises a fluorinated surfactant that is selected from the group consisting of ammonium carboxylic acid perfluoroether, $C_7F_{15}CH(OSO_3Na^+)C_7H_{15}$; bis(1H,1H,5H-octafluoro-n-pentyl) sodium sulfosuccinate (di-HCF4); sodium 1-oxo-1-[4-(perfluorohexyl)phenyl]hexane-2-sulfonate, FC6-HC4; 1-oxo-1-[4-(perfluorohexyl)phenyl]hexane (Nohead FC6HC4); sodium 1,5bis[(1H, 1H,2H,2H-perfluorobutyl)oxy]-1,5-dioxopentane-2-sulfonate (2FG(EO)$_2$); sodium 1,5-bis[(1H,1H,2H,2H-perfluorohexyl)oxy]-1,5dioxopentane-2-sulfonate (4FG(EO)$_2$); sodium 1,5-bis[(1H,1H,2H,2H-perfluorodecyl)oxy]-1,5-dioxopentane-2-sulfonate (8FG(EO)$_2$); sodium 1,4-bis[(1H,1H,2H,2H-perfluorohexyl)oxy]-1,4dioxobutane-2-sulfonate (4FS(EO)$_2$); sodium 1,4-bis[(1H,1H,2H,2H-perfluorodecyl)oxy]-1,4-dioxobutane-2-sulfonate (8FS(EO)$_2$), and [$C_6F_{13}$mim][(CF$_3$)3S], [$C_6F_{13}$mim]-[$C_6F_{13}$S], and [$C_5F_{11}$mim][$C_5F_{11}$S].

13. The method of claim 9, wherein the surfactant comprises a nonfluorinated surfactant that is a poly(ethylene glycol) 2,6,8-trimethyl-4-nonyl ether.

14. The method of claim 9, comprising:
delivering a pre-flush to the hydrocarbon reservoir prior to delivering the composition to the hydrocarbon reservoir; and
delivering a post-flush to the hydrocarbon reservoir subsequent to delivering the composition to the hydrocarbon reservoir.

15. The method of claim 9, comprising diverting the delivered composition to a particular location in the hydrocarbon reservoir.

16. A method for treating a hydrocarbon reservoir, comprising:
delivering a composition to the hydrocarbon reservoir, the composition comprising:
at least one acid, and
liquid or supercritical carbon dioxide ($CO_2$);
exposing the delivered composition to subterranean water in the hydrocarbon reservoir to activate the composition; and
treating a rock formation of the hydrocarbon reservoir with the activated composition,
wherein the composition comprises the at least one acid and the liquid or supercritical $CO_2$ in an acid-$CO_2$ emulsion that is exclusive of nanoparticles and comprises an outer continuous phase that comprises the liquid or supercritical $CO_2$ and an internal phase that comprises the at least one acid and a surfactant.

17. The method of claim 16, wherein the at least one acid comprises a first acid and a second acid, and wherein the first acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid, and the second acid is selected from the group consisting of acetic acid, trifluoroacetic acid, propanoic acid, formic acid, 2-hydroxypropanoic acid, and 2-hydroxyhexanoic acid.

18. The method of claim 16, wherein the at least one acid is selected from the group consisting of hydrochloric acid (HCl), a strong mineral acid, hydrofluoric acid (HF), a sulfonic acid, ethanesulfonic acid, p-toluene sulfonic acid, formic acid, lactic acid, acetic acid, propanoic acid, 2-hydroxypropanoic acid, and 2-hydroxyhexanoic acid.

19. The method of claim 16, wherein the surfactant comprises a fluorinated surfactant that is selected from the group consisting of ammonium carboxylic acid perfluoroether, $C_7F_{15}CH(OSO_3Na^+)C_7H_{15}$; bis(1H,1H,5H-octafluoro-n-pentyl) sodium sulfosuccinate (di-HCF4); sodium 1-oxo-1-[4-(perfluorohexyl)phenyl]hexane-2-sulfonate, FC6-HC4; 1-oxo-1-[4-(perfluorohexyl)phenyl]hexane (Nohead FC6HC4); sodium 1,5bis[(1H, 1H,2H,2H-perfluorobutyl)oxy]-1,5-dioxopentane-2-sulfonate (2FG(EO)$_2$); sodium 1,5-bis[(1H,1H,2H,2H-perfluorohexyl)oxy]-1,5dioxopentane-2-sulfonate (4FG(EO)$_2$); sodium 1,5-bis[(1H,1H,2H,2H-perfluorodecyl)oxy]-1,5-dioxopentane-2-sulfonate (8FG(EO)$_2$); sodium 1,4-bis[(1H,1H,2H,2H-perfluorohexyl)oxy]-1,4dioxobutane-2-sulfonate (4FS(EO)$_2$); sodium 1,4-bis[(1H,1H,2H,2H-perfluorodecyl)oxy]-1,4-dioxobutane-2-sulfonate (8FS(EO)$_2$), and [$C_6F_{13}$mim][($CF_3$)3S], [$C_6F_{13}$mim]-[$C_6F_{13}$S], and [$C_5F_{11}$mim][$C_5F_{11}$S].

20. The method of claim 16, wherein the surfactant comprises a nonfluorinated surfactant that is a poly(ethylene glycol) 2,6,8-trimethyl-4-nonyl ether.

21. The method of claim 16, comprising:
    delivering a pre-flush to the hydrocarbon reservoir prior to delivering the composition to the hydrocarbon reservoir; and
    delivering a post-flush to the hydrocarbon reservoir subsequent to delivering the composition to the hydrocarbon reservoir.

22. The method of claim 16, comprising diverting the delivered composition to a particular location in the hydrocarbon reservoir.

* * * * *